US009286446B2

(12) United States Patent
Berger

(10) Patent No.: US 9,286,446 B2
(45) Date of Patent: Mar. 15, 2016

(54) DOMAIN SPANNING APPLICATIONS

(75) Inventor: Richard Berger, Culver City, CA (US)

(73) Assignees: SONY CORPORATION, Tokyo (JP); SONY PICTURES TECHNOLOGIES INC., Culver City, CA (US)

(*) Notice: Subject to any disclaimer, the term of this patent is extended or adjusted under 35 U.S.C. 154(b) by 153 days.

(21) Appl. No.: 12/966,793

(22) Filed: Dec. 13, 2010

(65) Prior Publication Data

US 2011/0145896 A1 Jun. 16, 2011

Related U.S. Application Data

(60) Provisional application No. 61/285,730, filed on Dec. 11, 2009.

(51) Int. Cl.
*G06F 21/31* (2013.01)
*G06F 21/10* (2013.01)
*G06F 21/30* (2013.01)
*H04L 9/32* (2006.01)

(52) U.S. Cl.
CPC ........ *G06F 21/10* (2013.01); *G06F 2221/0706* (2013.01)

(58) Field of Classification Search
CPC .... H04W 12/06; H04W 8/186; H04L 63/083; H04L 9/0863; H04L 2209/603; G06F 21/31; H04N 1/4413; H04N 21/2541
USPC .......................................... 726/5, 6, 7, 8, 2, 3
See application file for complete search history.

(56) References Cited

U.S. PATENT DOCUMENTS

| 7,263,513 B2 * | 8/2007 | Kumagai ................. G06F 21/10 |
| 7,324,972 B1 * | 1/2008 | Oliver et al. ..................... 705/40 |
| 7,634,734 B2 | 12/2009 | Fuller et al. |
| 7,908,647 B1 * | 3/2011 | Polis ................. G06F 17/30997 713/151 |
| 8,028,322 B2 * | 9/2011 | Riedl ..................... H04N 5/913 725/100 |
| 8,336,090 B2 * | 12/2012 | Ache ....................... G06F 21/10 705/75 |
| 2007/0220010 A1 * | 9/2007 | Ertugrul ................. G06Q 30/02 |

FOREIGN PATENT DOCUMENTS

WO    2008/111052 A2    9/2008

OTHER PUBLICATIONS

Amazon Web Services, "STR3EM—Digital Distribution System (Ultraviolet—Keychest)," Amazon Web Services, Jun. 22, 2009, internet website: http://aws.amazon.com/customerapps/2621 (3 pages).
Cnet Download.Com, "STR3EM specifications," Cnet publications, Dec. 9, 2009, internet website: http://download.cnet.com/STR3EM/3010-13632_4-10976652 (2 pages).

* cited by examiner

*Primary Examiner* — Michael Chao
*Assistant Examiner* — Shiuh-Huei Ku
(74) *Attorney, Agent, or Firm* — Procopio, Cory, Hargreaves & Savitch, LLP

(57) ABSTRACT

Managing and accessing media items, including: a plurality of domains configured to provide access to media items; a plurality of clients associated with the plurality domains, and providing a pathway for accessing the media items; and a spanning application configured to track and aggregate accessible media items from the plurality of domains based on authentication and registration information and associated rights of the plurality of clients and the plurality of domains, wherein the spanning application enables accessing of the media items across the plurality of domains.

11 Claims, 4 Drawing Sheets

DOMAIN SPANNING APPLICATIONS

CROSS-REFERENCE TO RELATED APPLICATIONS

This application claims the benefit of priority under 35 U.S.C. §119(e) of U.S. Provisional Patent Application No. 61/285,730, filed Dec. 11, 2009, entitled "Domain Spanning." The disclosure of the above-referenced application is incorporated herein by reference.

BACKGROUND

1. Field of the Invention

The present invention relates to media management and access, and more specifically, to media management and access utilizing a domain spanning model.

2. Background

Systems and methods for managing and accessing digital content allow a consumer to purchase digital content electronically. Examples of digitally distributed content include video and music files offered for sale on the Internet. The consumer purchases and downloads the content for viewing or listening on a suitable device, and may be allowed a certain number of copies of the content to be made.

Conventionally, online stores make digital content available in proprietary formats according to the requirements of a target user device. Further, online stores often implement various business models and usage models, such as procedures for payment, and for downloading, storing, replicating and accessing the content.

One particular problematic usage model imposes a maximum copy count allowed to a consumer after purchasing content. For example, the consumer may be limited to four copies of the content once. Two copies are used immediately for the consumer's computer and portable device. However, computer hard drive and portable device failures may eventually lead to a situation where the consumer is left with no usable copies.

Various such requirements imposed by online stores tend to lock consumers into a "silo" consisting of a single user device platform, a single media format, and a single content source (e.g., network service such as an online store). Consumers that purchase content from these silo services are unable to access their content on other devices they may own which are not supported by that proprietary silo. As a result, these kinds of restrictions tend to lower consumers' perceived value of the "ecosystem" encompassing all electronic content distribution systems.

SUMMARY

Implementations of the present invention provide for media management and access techniques using a domain spanning concept.

In one implementation, a system of managing and accessing media items is disclosed. The system includes: a plurality of domains configured to provide access to media items; a plurality of clients associated with the plurality domains, and providing a pathway for accessing the media items; and a spanning application configured to track and aggregate accessible media items from the plurality of domains based on authentication and registration information and associated rights of the plurality of clients and the plurality of domains, wherein the spanning application enables accessing of the media items across the plurality of domains.

In another implementation, a method of managing and accessing media items is disclosed. The method includes: tracking authentication and registration information and associated rights of a plurality of clients for accessing a plurality of accessible media items from a plurality of domains; aggregating the plurality of accessible media items from the plurality of domains based on the authentication and registration information and associated rights of the plurality of clients; and accessing the media items across the plurality of domains.

In another implementation, a non-transitory tangible storage medium storing a computer program for managing and accessing media items is disclosed. The computer program comprises executable instructions that cause a computer to: track authentication and registration information and associated rights of a plurality of clients for accessing a plurality of accessible media items from a plurality of domains; aggregate the plurality of accessible media items from the plurality of domains based on the authentication and registration information and associated rights of the plurality of clients; and access the media items across the plurality of domains.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which.

DETAILED DESCRIPTION

Figure 1:
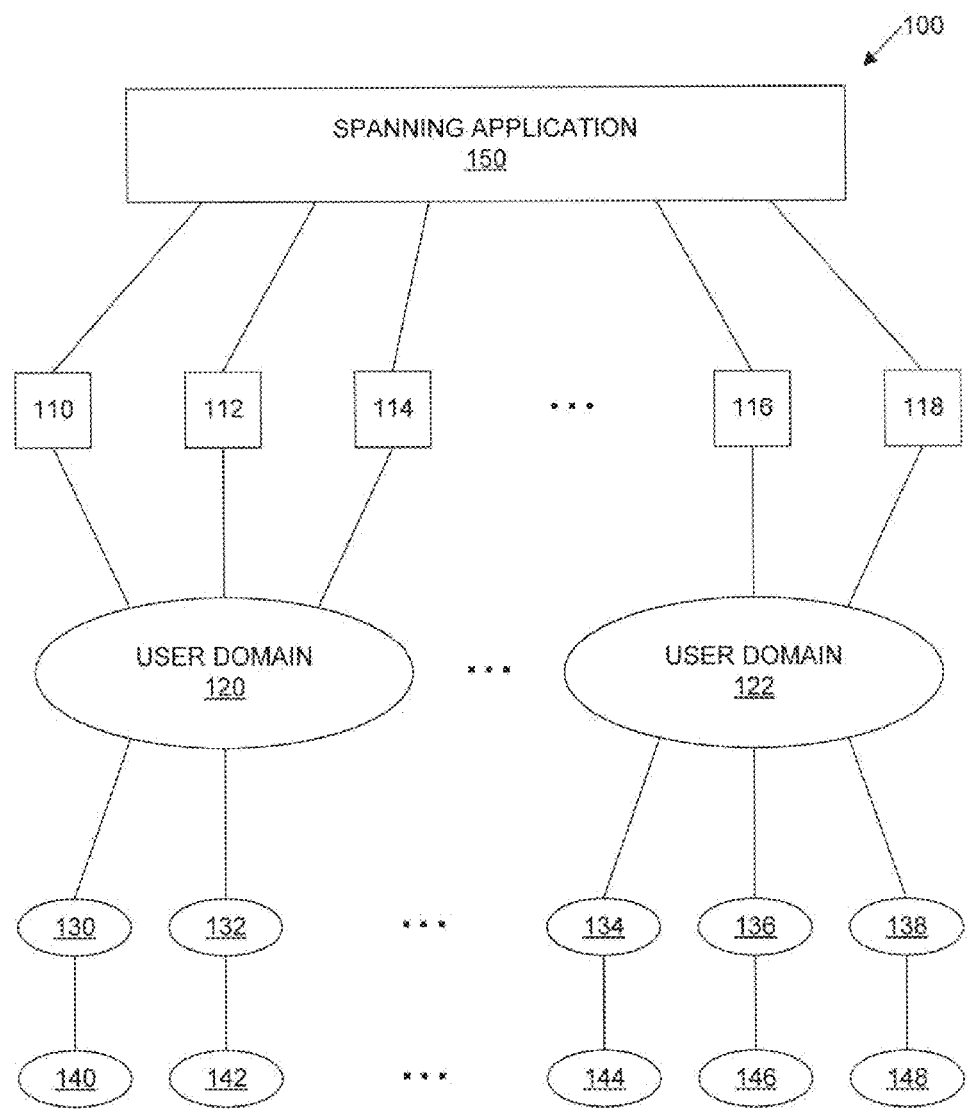
FIG. 1 shows a media access and management system in accordance with one implementation of the present invention.

Certain implementations as disclosed herein provide for media management and access techniques using a domain (or user domain) spanning concept. In one implementation, a single client application aggregates rights from multiple domains and/or user accounts (hereinafter collectively referred to as "domains") into a single view thus spanning access of content for a single "virtual" client across multiple domains. In a particular implementation, the technique includes a local media player and/or library management software application. After reading this description it will become apparent how to implement the invention in various implementations and applications. However, although various implementations of the present invention will be described herein, it is understood that these implementations are presented by way of example only, and not limitation. As such, this detailed description of various implementations should not be construed to limit the scope or breadth of the present invention.

In a user domain, a set of registered devices allows a consumer to freely access purchased content. The content is associated with the user domain and may only play on devices registered with the user domain. Thus, a conventional usage model can include unrestricted access within a single domain of registered devices and one export of a content item to a discrete medium (e.g., a DVD back-up). Rules may be imposed, for example, to limit a user domain to a predetermined member devices (e.g., 12), to limit membership for an individual user device to only one user domain at a time, to require expiration of a device's domain membership after a certain number of days of inactivity (e.g., 180 days but renewable), and to require association of a user account with a single user domain at any given time.

Various roles can be assigned to participant in the domain concept. For example, content providers license content to retailers; domain service providers manage digital rights management (DRM) domains and provide licenses and content fulfillment services; retailers provide storefront services to consumers and sell the licensed content; device makers manufacture compliant devices to play the content; and a coordinator may manage domain identities and facilitate interoperability between domain service providers (DSPs).

The stores sell licensed content to consumers. A domain service provider (DSP) associated with a store functions as a "back-end" for the store. The DRM license servers of a DSP generate DRM licenses which enforce rights sold by the stores associated with the DSP. The DRM domain managers enforce domain membership by creating and managing, for example, lower-level DRM objects such as domain keys. A rights locker of a DSP holds the rights to content acquired at stores associated with the DSP. Interfaces allow multiple, independent DSPs to enforce the domain model by interacting with a centralized coordinator. The coordinator manages domain IDs and supports the sharing of information necessary for interoperability among the DSPs.

FIG. 1 shows a media access and management system 100 in accordance with one implementation of the present invention. The system 100 includes clients 110, 112, 114 linked to a user domain 120 and clients 116, 118 linked to a user domain 122. In the illustrated implementation of FIG. 1, the clients 110, 112, 114, 116, 118 link only to one user domain 120 or 122 at a time. However, in other implementations, a client may link to more than one domain at a time. Further, although FIG. 1 only shows two domains and five clients, any number of domains and clients can be linked together.

The system 100 also includes a plurality of content sources 140, 142, 144, 146, 148 from which a consumer may acquire content to be managed by the user domains 120, 122. For example, content sources 140, 142, 144, 146, 148 may be different online stores making available various types of digital content in a variety of formats and/or according to a variety of usage models. The content sources 140 and 142 supply the user domain 120 while the content sources 144, 146, 148 supply the user domain 122. Each content source 140, 142, 144, 146, or 148 is associated with a user domain 120 or 122 by way of a corresponding user account 130, 132, 134, 136, or 138.

All of the user accounts 130, 132, 134, 136, 138 may be associated with the same consumer or consumers within a "household", and each separate user account 130, 132, 134, 136, 138 associates the consumer with each corresponding content source 140, 142, 144, 146, 148. Content that comes into the user domain 120 from the content sources 140, 142 therefore enters through one of the user accounts 130, 132, while content that comes into the user domain 122 from the content sources 144, 146, 148 enters through one of the user accounts 134, 136, 138. Thus, only the clients 110, 112, 114, 116, 118 associated with the user domains 120, 122 may access the content.

The content is bound to the particular user account 130, 132, 134, 136, 138 with which the content was acquired. For example, a content item (not shown) acquired from content source 140 will be bound to user account 130, and cannot be transferred to a different user account. However, the association of the user account 130 with the user domain 120 may be severed and re-established with another user domain (e.g., 122). In this way, content may be transferred from one user domain to another at the user account level. In another implementation, by contrast, a content item may be transferred to another user domain by transferring it to a user account linked to that user domain, thus refining the granularity of separation from account level to content item level. In a further implementation, the user accounts and the user domains may be collectively referred to as domains. For example, in the illustrated implementation of FIG. 1, the user accounts 130 and 132 are subsumed in the user domain 120 and the user accounts 134, 136, 138 are subsumed in the user domain 122.

The system 100 further includes a spanning application 150 which manages registrations of multiple clients 110, 112, 114, 116, 118 and/or domains 120, 122. The management functions include tracking authentication and registration information and associated rights of the clients and/or domains. The spanning application 150 also aggregates accessible contents into one or more views based on the rights of multiple clients and/or domains. Thus, when the accessible contents are aggregated into a single view, the multiple origins of the contents are transparent to the user. The spanning application 150 also provides appropriate information to allow access to selected content(s).

Figure 2:
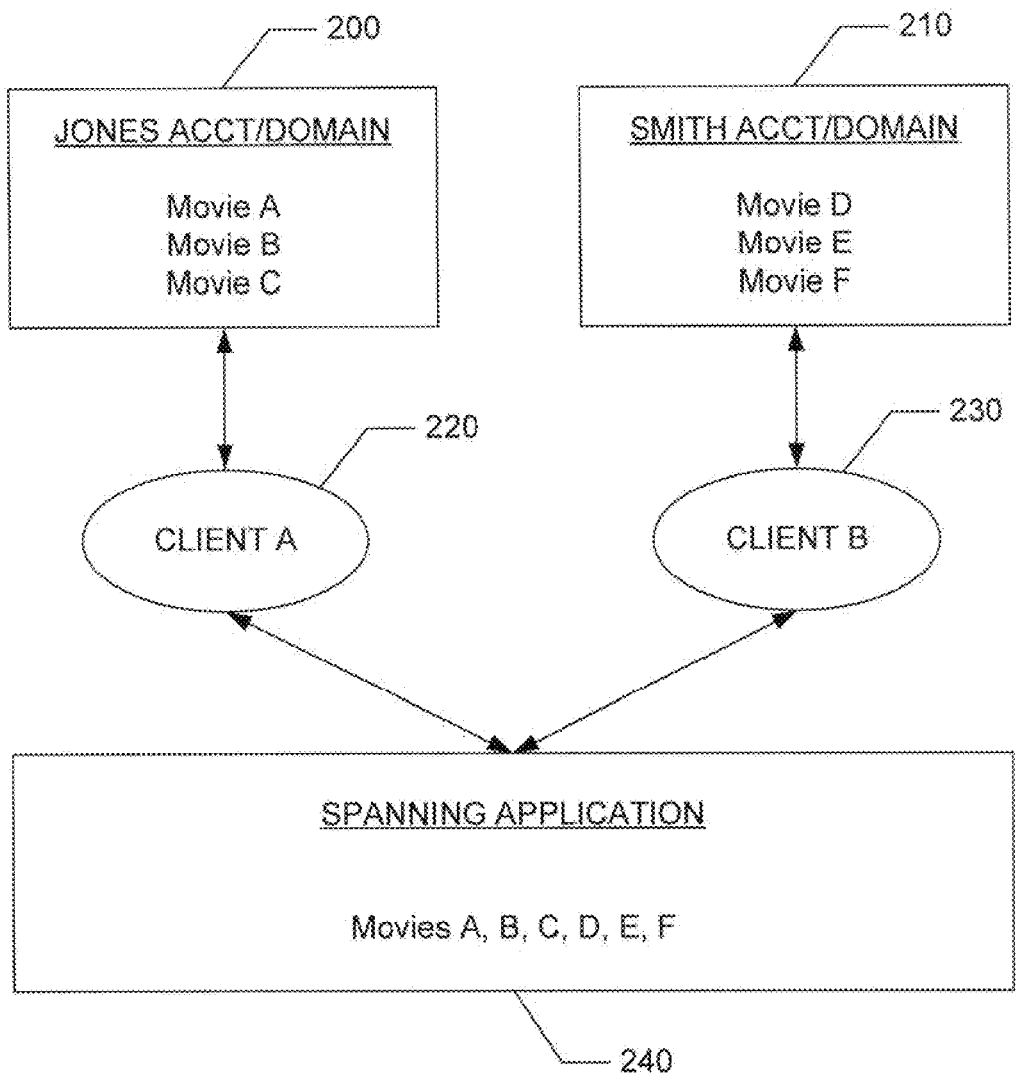
FIG. 2 shows an example implementation of the media access and management system including a spanning application.

FIG. 2 shows an example implementation of the media access and management system 100 including a spanning application 240. This example implementation includes accessing movies from two user domains, Jones domain 200 and Smith domain 210. Jones domain 200 includes movies A, B, and C, while Smith domain 210 includes movies D, E, and F. In one implementation, movies A, B, and C are obtained from one content source through Jones account tied to the Jones domain, and movies D, E, and F are obtained from another content source through Smith account tied to the Smith domain. Client A 220 is associated with Jones domain 200, while client B 230 is associated with Smith domain 210. Accordingly, client A 220 has access to and can play movies A, B, and C, while client B 230 has access to and can play movies D, E, and F.

As explained above, the spanning application 240 is configured to interact with both clients A and B. A user of the spanning application 240 can then access all six movies A, B, C, D, E, and F through the connections to client A 220 and client B 230. In one implementation, the user of the spanning application 240 is presented with a list of these movies as being available for viewing without differentiating to the user between movies from the Jones domain 200 and movies from the Smith domain 210. Similarly, the spanning application 240 takes care of the logistics of fulfillment (transport, authentication) for the user. Thus, when the accessible movies A, B, C and D, E, F are aggregated into a single view (i.e., a single view showing all movies A, B, C, D, E, F), the multiple origins of the contents are transparent to the user. That is, the user will not know that movies A, B, C are associated with Jones domain 200 through client A 220 and that movies D, E, F are associated with Smith domain 210 through client B 230.

Figure 3:
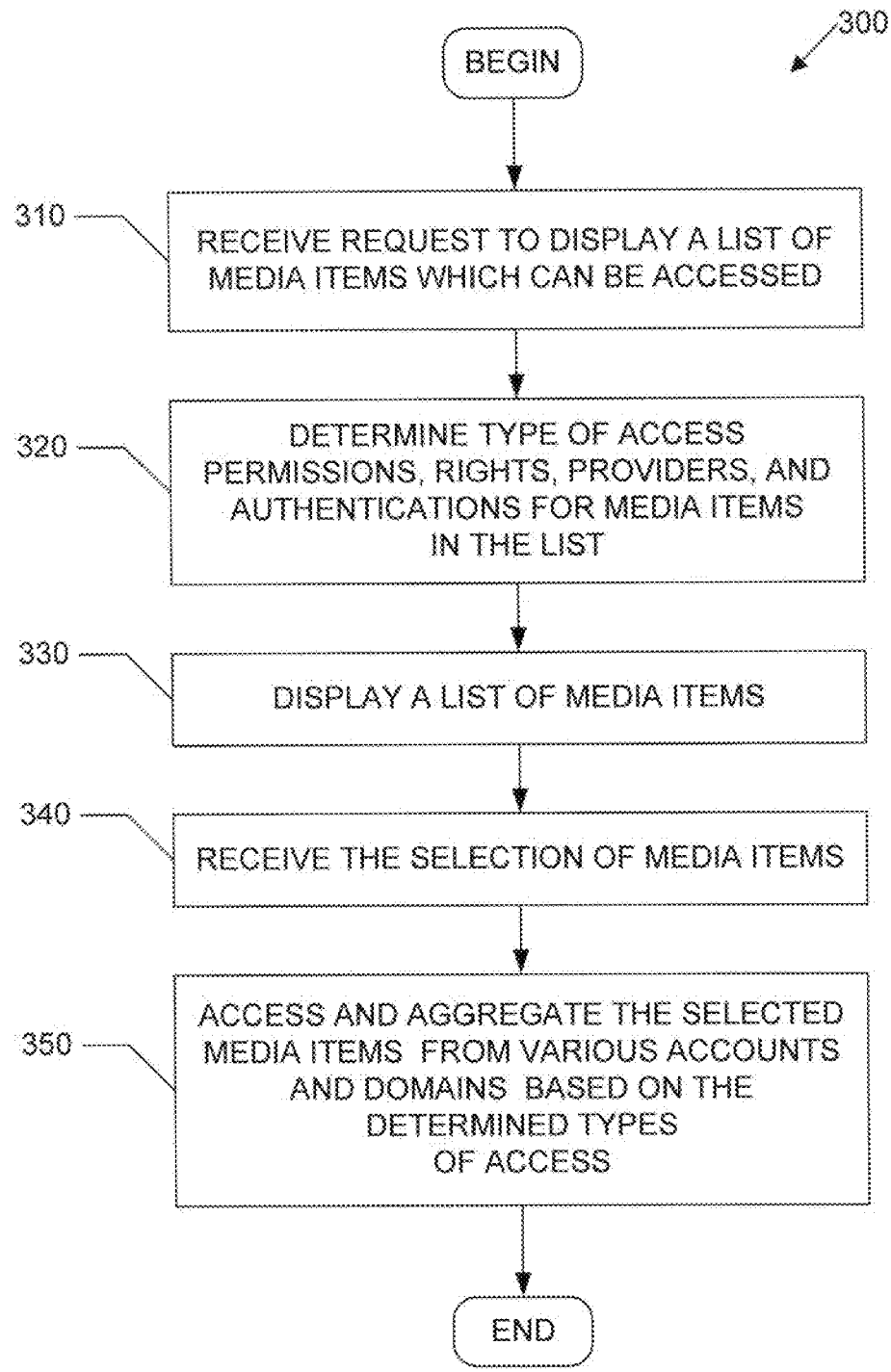
FIG. 3 is a flowchart illustrating a technique for managing and accessing media in accordance with one implementation of the present invention.

FIG. 3 is a flowchart 300 illustrating a technique for managing and accessing media in accordance with one implementation of the present invention. The technique includes a single client application which aggregates rights from multiple domains and/or user accounts into a single view.

In the illustrated implementation of FIG. 3, a request to display a list of media items which can be accessed is received, at 310. The type of access permissions, rights, service provides, and authentications for the media items in the list are then determined, at 320, and the list is displayed, at 330. In one implementation, a system for media management and access provides an application presenting "views of rights" to content (including a single/aggregated view) from multiple/different user accounts and/or domains to a single user (based on rights granted to multiple separate clients/users), such as locally on the user's home network or online in the cloud (network).

When the media items are selected and requested for access (viewing and/or acquisition such as downloading or streaming), at 340, the selected media items are accessed and aggregated from various accounts and domains based on the determined types of access, at 350. In this case, the spanning application either maintains multiple user account/domain credentials, or rapidly and seamlessly removes itself and re-adds itself to the various underlying user accounts and/or domains to provide just-in-time access to content rights. Further, the spanning application automatically and intelligently switches its client domain and/or user identity or association to provide the necessary credentials for client domain membership or user account to gain access to the rights on such domain/account for the corresponding user.

Figure 4A:
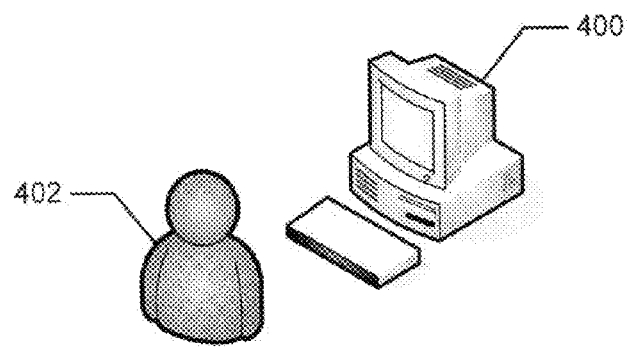
FIG. 4A illustrates a representation of a computer system and a user.

FIG. 4A illustrates a representation of a computer system 400 and a user 402. The user 402 can use the computer system 400 to implement content distribution. The computer system 400 stores and executes a media management and access system 490.

Figure 4B:
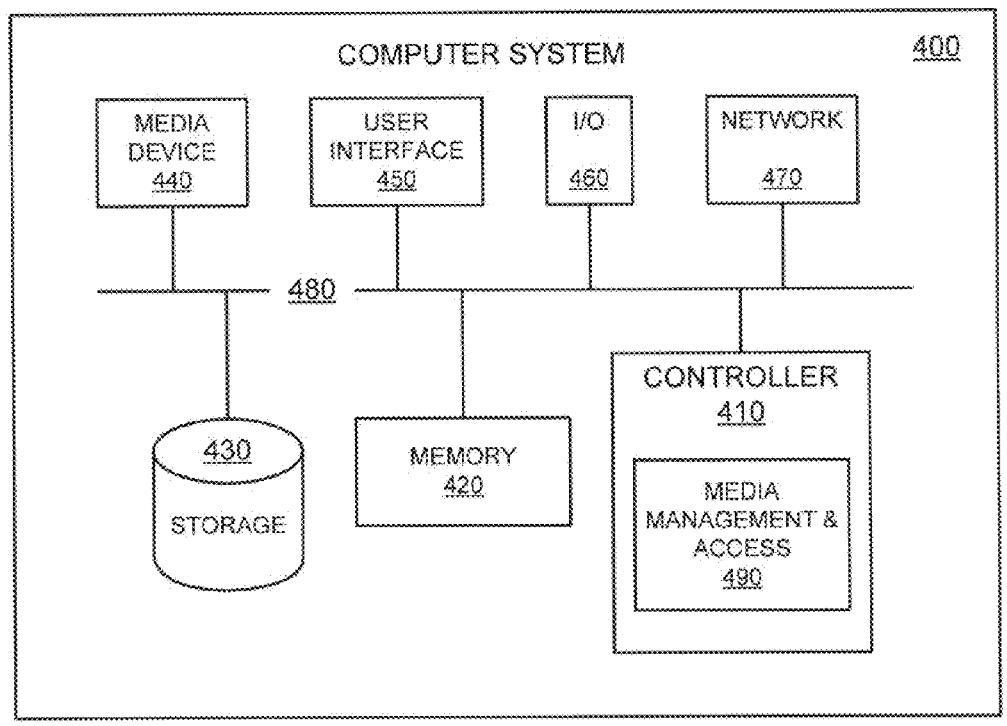
FIG. 4B is a functional block diagram illustrating the computer system hosting the media management and access system in accordance with one implementation of the present invention.

FIG. 4B is a functional block diagram illustrating the computer system 400 hosting the media management and access system 490 in accordance with one implementation of the present invention. The controller 410 is a programmable processor and controls the operation of the computer system 400 and its components. The controller 410 loads instructions from the memory 420 or an embedded controller memory (not shown) and executes these instructions to control the system. In its execution, the controller 410 provides the media management and access system 490 as a software system. Alternatively, this service can be implemented as separate components in the controller 410 or the computer system 400.

Memory 420 stores data temporarily for use by the other components of the computer system 400. In one implementation, memory 420 is implemented as RAM. In one implementation, memory 420 also includes long-term or permanent memory, such as flash memory and/or ROM.

Storage 430 stores data temporarily or long term for use by other components of the computer system 400, such as for storing data used by the media management and access system 490. In one implementation, storage 430 is a hard disk drive.

The media device 440 receives removable media and reads and/or writes data to the inserted media. In one implementation, the media device 440 is an optical disc drive.

The user interface 450 includes components for accepting user input from the user of the computer system 100 and presenting information to the user. In one implementation, the user interface 450 includes a keyboard, a mouse, audio speakers, and a display. The controller 410 uses input from the user to adjust the operation of the computer system 400.

The I/O interface 460 includes one or more I/O ports to connect to corresponding I/O devices, such as external storage or supplemental devices (e.g., a printer or a PDA). In one implementation, the ports of the I/O interface 460 include ports such as: USB ports, PCMCIA ports, serial ports, and/or parallel ports. In another implementation, the I/O interface 460 includes a wireless interface for communication with external devices wirelessly.

The network interface 170 includes a wired and/or wireless network connection, such as an RJ-45 or "Wi-Fi" interface (including, but not limited to 802.11) supporting an Ethernet connection.

A system communication path 480 (e.g., a system communication bus) provides for transfers of data and control information between the media device 440, user interface 450, I/O interface 460, network interface 470, storage 430, memory 420, and controller 410.

The computer system 400 includes additional hardware and software typical of computer systems (e.g., power, cooling, operating system), though these components are not specifically shown in FIG. 4B for simplicity. In other implementations, different configurations of the computer system can be used (e.g., different bus or storage configurations or a multi-processor configuration).

In one implementation, the media management and access system 490 includes a media player to fulfill requests. For example, the media player can be used to view available media, select media for playback, and play the media. Examples of media items include video, images, and audio (e.g., movies, television programs, recorded video, music, recorded audio, games, and software). The media player can also call on other tools (software applications or components) to access, store, playback, and/or execute media. In other uses, different platforms can be used (such as a mobile device or phone or a game console).

A user operates the media player to display a list of media which the user has permission to access. From the user's point of view, the displayed list does not distinguish among user accounts (though such a display could optionally be provided). Each item in the list is a media item for which the user has permission to access (as defined by an applicable license, but potentially including opening, copying, downloading, streaming, playing, and/or executing). The user may have multiple accounts (or identities or accessible domains). Each account may have different access permissions or be with different service providers. Further, the access rights for the account may vary depending on the device currently being used. The media player has a record of these multiple accounts and the corresponding authentication information (e.g., provided by the user). When the user requests the menu or list of available media, the media player checks what media items are available for each account and compiles a unified list or set of information. This check could include querying service providers and/or checking local and network storage, providing identification and authentication information as needed. The media player presents the list to the user, such as through the user interface of the computer system display. The information need not be presented as an item-by-item list and other organizations could also be used. The list may also indicate the type of access available for the item (e.g., streaming only or locally stored).

The user selects a media item from the presented list and requests an operation, such as play or copy, or uses a default operation. The media player accesses the selected item from the corresponding source as requested, providing appropriate information to complete the access. Thus, the user can register multiple accounts with a single software tool and then seamlessly access the corresponding media items. Further, the media player resolves the logistics of fulfillment, removing the burden (at least in part) from the user.

Various illustrative implementations of the present invention have been described. However, one of ordinary skill in the art will see that additional implementations are also possible and within the scope of the present invention. For example, the media player may only be a media access or interface tool, where the actual playback or manipulation of media items is handled by a different application. Similarly, the media player could be a stand-alone application, or integrated into another application (directly, or as a modular component, such as a library or plug-in). Accordingly, the present invention is not limited to only those implementations described above. It is further understood that the scope of the present invention fully encompasses other implementations that may become obvious to those skilled in the art and that the scope of the present invention is accordingly limited by nothing other than the appended claims.

What is claimed is:

1. A system of managing and accessing media items, the system comprising:
   a plurality of domains configured to provide access to the media items;
   a plurality of client devices associated with the plurality of domains, and providing a pathway for accessing the media items; and
   a spanning application configured to track and aggregate accessible media items from the plurality of domains based on authentication and registration information and associated rights of a particular client device of the plurality of client devices,
   wherein the spanning application enables accessing of the media items across the plurality of domains for the particular client device by at least one of: (1) maintaining multiple user account and domain credentials; and (2) seamlessly removing itself and re-adding itself to a plurality of user accounts and the plurality of domains necessary to provide access to the media items for the particular client device;
   wherein a plurality of origins of the accessible media items accessed from the plurality of domains are transparent to the particular client device such that the origin of each accessible media item is indistinguishable from any particular domain;
   wherein the accessible media items are aggregated into a single view on the particular client device;
   wherein the single view includes a view of rights to the accessible media items from the plurality of domains; and
   wherein the view of rights to the accessible media items is based on rights granted to the particular client device and based on rights granted to a particular user account.

2. The system of claim 1, wherein the particular client device of the plurality of client devices is associated with only one domain of the plurality of domains at one time but the media items from the plurality of domains are accessible to the particular client device.

3. The system of claim 1, wherein the single view is presented locally on a home network.

4. The system of claim 1, wherein the spanning application comprises
   means to remove itself from one domain and add to another domain to gain access to the accessible media items.

5. A method of managing and accessing media items, the method comprising:
   tracking authentication and registration information and associated rights of a particular client device for accessing a plurality of accessible media items from a plurality of domains;
   aggregating the plurality of accessible media items from the plurality of domains based on the authentication and registration information and associated rights of the particular client device; and
   accessing the media items across the plurality of domains for the particular client device using a spanning application,
   wherein the spanning application enables accessing the media items across the plurality of domains by at least one of: (1) maintaining multiple user account and domain credentials; and (2) seamlessly removing itself and re-adding itself to a plurality of user accounts and the plurality of domains necessary to provide access to the media items for the particular client device;
   wherein a plurality of origins of the accessible media items accessed from the plurality of domains are transparent to the particular client device such that the origin of each accessible media item is indistinguishable from any particular domain;
   wherein the accessible media items are aggregated into a single view on the particular client device;
   wherein the single view includes a view of rights to the accessible media items from the plurality of domains; and
   wherein the view of rights to the accessible media items is based on rights granted to the particular client device and based on rights granted to a particular user account.

6. The method of claim 5, wherein the particular client device of the plurality of client devices is associated with only one domain of the plurality of domains at one time, but the media items from the plurality of domains are accessible to the particular client device.

7. The method of claim 5, further comprising
   maintaining multiple user account/domain credentials for accessing the plurality of accessible media items from the plurality of domains.

8. The method of claim 5, further comprising
   disengaging from one domain and adding to another domain to gain access to the plurality of accessible media items.

9. A non-transitory tangible storage medium storing a computer program for managing and accessing media items, the computer program comprising executable instructions that cause a computer to:
   track authentication and registration information and associated rights of a particular client device for accessing a plurality of accessible media items from a plurality of domains;
   aggregate the plurality of accessible media items from the plurality of domains based on the authentication and registration information and associated rights of the particular client device; and
   access the media items across the plurality of domains for the particular client device using a spanning application,
   wherein the spanning application enables accessing the media items across the plurality of domains by at least one of: (1) maintaining multiple user account and domain credentials; and (2) seamlessly removing itself and re-adding itself to a plurality of user accounts and the plurality of domains necessary to provide access to the media items for the particular client device;
   wherein a plurality of origins of the accessible media items accessed from the plurality of domains are transparent to the particular client device such that the origin of each accessible media item is indistinguishable from any particular domain;

wherein the accessible media items are aggregated into a single view on the particular client device;

wherein the single view includes a view of rights to the accessible media items from the plurality of domains; and wherein the view of rights to the accessible media items is based on rights granted to the particular client device and based on rights granted to a particular user account.

10. The non-transitory tangible storage medium of claim 9, further comprising executable instructions that cause a computer to maintain multiple user account/domain credentials for accessing the plurality of accessible media items from the plurality of domains.

11. The non-transitory tangible storage medium of claim 9, further comprising executable instructions that cause a computer to disengage from one domain and adding to another domain to gain access to the plurality of accessible media items.

* * * * *